July 27, 1954
C. HOLZ
2,684,815
MAGNETIC FILM HOLDER FOR FILM REELS
Filed Feb. 27, 1951
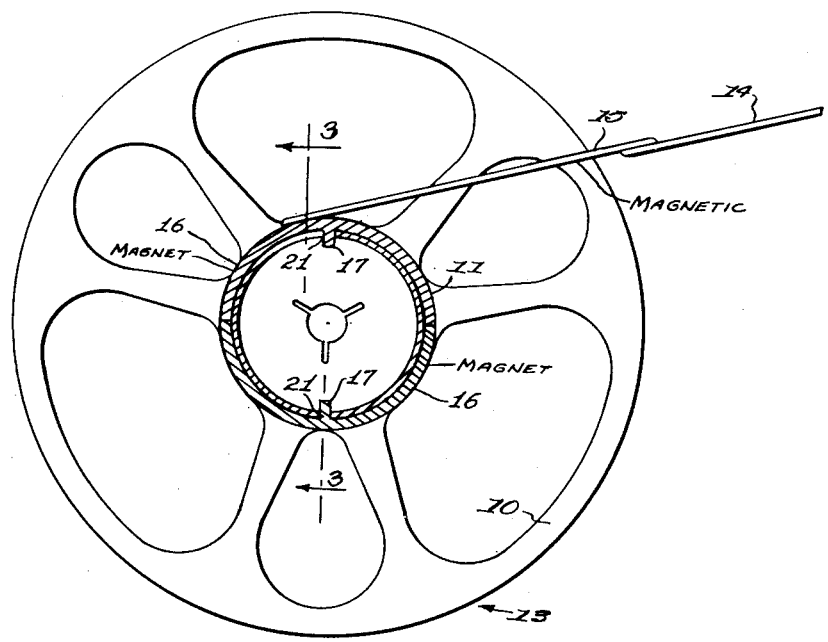
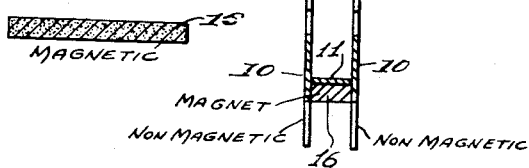
INVENTOR.
Charles Holz,
BY Victor J. Evans & Co.
ATTORNEYS Patented July 27, 1954

2,684,815

UNITED STATES PATENT OFFICE 2,684,815

MAGNETIC FILM HOLDER FOR FILM REELS

Charles Holz, Charleston, W. Va.

Application February 27, 1951, Serial No. 212,952

3 Claims. (Cl. 242—74)

This invention relates to moving picture equipment, and more particularly to a magnetic-type reel for holding film.

It is a difficult problem to insert the end of film in the slot of a standard take-up reel and then hold the film in place while the reel is turned over a sufficient number of times to insure that the end of the film will remain in place on the hub of the wheel. It is accordingly an object of the present invention to provide a means for overcoming this difficulty.

Another object of the invention is to provide a magnetic film holding reel wherein the threading of movie film on the take-up reel of a motion picture projector will be facilitated.

Still another object of the invention is to provide a film holding reel which includes a pair of opposed semicircular magnets surrounding the reel hub, so that by attaching a leader strip of ferrous material to the end of the strip, threading of the film strip on the reel will be facilitated.

A further object of the invention is to provide a film threading means which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a sectional view taken through a film holding reel having magnets on the hub thereof, according to the present invention;

Figure 2 is a top plan view of the assembly shown in Figure 1;

Figure 3 is a sectional view taken on the line 3—3 of Figure 1;

Figure 4 is a transverse sectional view taken through the leader strip impregnated with ferrous material.

Referring in detail to Figures 1 through 4 of the drawings, the numeral 10 designates each of a pair of spaced parallel annular side walls or flanges which may be made of any suitable non-magnetic material such as plastic or aluminum. Arranged between the pair of side walls 10 and secured thereto is a cylindrical hub 11, Figure 1, and connected to the hub 11 is a permanent magnet.

The numeral 14 designates a portion of a film strip which is adapted to be wound on the reel 13. The reel 13 includes the hub 11 and the side walls 10.

Secured to one end of the film strip 14 in any suitable manner is a flexible leader strip 15, and the leader strip 15 is impregnated with a ferrous material, Figure 4. Thus, the leader strip 15 will be attracted toward the magnet so that the threading of the film strip 14 on the hub 11 will be facilitated.

The hub 11 is provided with a pair of opposed slots 21, and arranged in surrounding relation with respect to the hub 11 is a pair of semi-cylindrical permanent magnets 16. Each of the magnets 16 is provided with a tit or lug 17 which projects through the slots 21 so as to prevent accidental sliding movement of the magnets 16 on the hub 20. The magnets 16 serve to attract the leader strip 15 whereby threading of the film strip on the reel 18 will be facilitated.

The magnets 16 will attract the leader strip 15 which is impregnated with a ferrous material so that winding or threading of the film strip 14 on the reel 13 will be facilitated. The permanent magnets 16 may be installed in the hub 11 of the reel during the manufacture of the reel. When it is desired to convert reels which are already being used into the magnetic-type, the pair of the semi-cylindrical permanent magnets 16 as shown in Figure 5, can be surrounded or positioned on the hub 11 of the reel 13, and these magnets 16 can be used for attracting the leader strip 15 whereby threading of the film strip on the reel will be facilitated.

The pair of magnets 16 will be attracted together due to the magnetic attraction of these magnets so that they will be held in place on the hub of the reel. The tits 17 engage in the slots 21 to prevent the magnets 16 from spinning or sliding on the hub. The side walls of the reel may be made of a non-magnetic material and the hub may be made of the same material that the side walls are made of. Each half or each end of the magnets 16 is ground smooth so that a good magnetic path is established. Instead of attaching the flexible leader strip 15 to the film strip 14, a small metal clip may be used on the end of the film strip 14. By means of the magnets and leader strip, the end of the film strip 14 will be attracted to the permanent magnet and held in place so that when the take-up reel is rotated, the film strip 14 will be wound upon the hub. If desired, the end of the film strip may be impregnated with a powdered ferrous material which will be attracted to the magnet. Also, the hub itself may be made of a magnet. The magnetic materials may be of the Alnico-type.

Further, by means of the present invention, a person will be able to overcome the difficult problem of inserting the end of the film in the slot of a standard take-up reel and holding it there with the fingers while the reel is turned over a sufficient number of times to insure that the end of the film remains in place on the hub of the reel. Further, it is extremely simple to drop the magnetic holder strip down between the sides of the reel until it comes in contact with the hub so that the hub can be spun and the film will be wound up without the necessity of holding the film in position with the fingers.

Having described the invention, what is claimed as new is:

1. In combination, a film reel including spaced parallel annular side walls and a cylindrical hub mounted centrally between said side walls, a film strip adapted to be wound on said hub, of a leader strip impregnated with a ferrous material arranged on an end of said film strip, magnetic means on said hub for coacting with said film strip to facilitate the threading of said film strip on the reel, said magnetic means comprising a pair of semi-cylindrical permanent magnets mounted on said hub, there being diametrically opposed slots arranged in said hub, tits extending inwardly from said magnets through said slots, the ends of said magnets being arranged in abutting relation with respect to each other.

2. In combination, a film reel including side walls and a cylindrical hub mounted between said side walls, a film strip adapted to be wound on said hub, of a leader strip impregnated with a ferrous material arranged on an end of said film strip, magnetic means on said hub for coacting with said film strip to facilitate the threading of said film strip on the reel, said magnetic means comprising a pair of permanent magnets mounted on said hub, there being slots arranged in said hub, tits extending inwardly from said magnets through said slots, the ends of said magnets being arranged in abutting relation with respect to each other.

3. A film reel comprising a cylindrical hub having parallel flanges at the ends and also having spaced longitudinally disposed slots therein, and semi-cylindrical magnets positioned on said hub and retained in position thereon with magnetic attraction inherent in said magnets, each of said magnets having tits on inner surfaces thereof and said tits being positioned to register with the slots of the hub whereby with the tits extended into the slots rotation of the magnets on the hub is prevented.

References Cited in the file of this patent

UNITED STATES PATENTS

| Number | Name | Date |
|---|---|---|
| 824,292 | Gerhard | June 26, 1906 |
| 1,222,827 | Webster | Apr. 17, 1917 |
| 1,498,133 | Swem et al. | June 17, 1924 |
| 1,692,789 | Young | Nov. 20, 1928 |